United States Patent Office 2,968,659
Patented Jan. 17, 1961

2,968,659

SULFUR-CONTAINING DERIVATIVES OF PERHALOOLEFINS

Calvin J. Benning, Mahwah, N.J., assignor, by mesne assignments, to Minnesota Mining and Manufacturing Company, St. Paul, Minn., a corporation of Delaware No Drawing. Filed Mar. 21, 1958, Ser. No. 722,837

5 Claims. (Cl. 260—327)

This invention relates to sulfur-containing derivatives of perhaloolefins and a method for the preparation thereof. In one aspect this invention relates to heterocyclic disulfides of perhalodiolefins and a method for the preparation thereof. In another aspect the invention relates to heterocyclic disulfides of perfluorodiolefins and a method for the preparation thereof.

Fluorinated organic compounds have recently come into considerable prominence where it is desired to take advantage of this resistance to chemical and thermal attack. This is particularly true of compounds containing a substantial amount of fluorine. For example, polymers of perfluoro and perfluorochloro olefins have been found to be particularly advantageous in such applications as gasket and packing materials, electrical insulation, heat transfer media, etc. Other uses of such compounds need not be detailed here and indeed the field of their application has hardly been exploited.

The disulfides produced by the method of the present invention may be used as lubricants, solvents, heat transfer media and the like, particularly where a high degree of chemical stability is desired. They may also be used as plasticizers for fluorine-containing polymers of high molecular weight. By breaking the sulfur-to-sulfur bond these compounds may serve as intermediates in the production of further chemical compounds. In polymerization reaction the unsaturated compounds may be important as monomers. Such compounds, obtained from sulfur addition to fluoroolefins, may also form a new basis for high temperature stable materials, such as fluorothioethers.

One of the objects of this invention is to provide a method for preparing novel sulfur-containing derivatives of perhaloolefins.

Another object of this invention is to provide a method for preparing heterocyclic disulfide derivatives of perhaloolefins.

Still another object of this invention is to provide a method for preparing heterocyclic disulfide derivatives of perfluorodiolefins.

It is also an object of this invention to provide novel sulfur-containing derivatives of perhaloolefins.

It is another object of this invention to provide heterocyclic disulfide derivatives of perhaloolefins, particularly perfluorodiolefins.

Other objects of the invention will become apparent from the following more detailed disclosure.

The new compounds of the present invention are disulfides of perhaloolefins, which disulfides contain at least one fluorine atom for every two carbon atoms, the disulfide or —S—S— linkage forming a portion of a six-membered heterocyclic ring structure. These compounds are prepared by reacting sulfur at elevated temperatures with perhalodiolefins containing in a straight chain between 4 and 8 carbon atoms, each of which has at least one substituent, and containing two double bonds in the straight chain.

According to the present invention the heterocyclic perhalocarbon disulfides are made by carrying out the following reaction

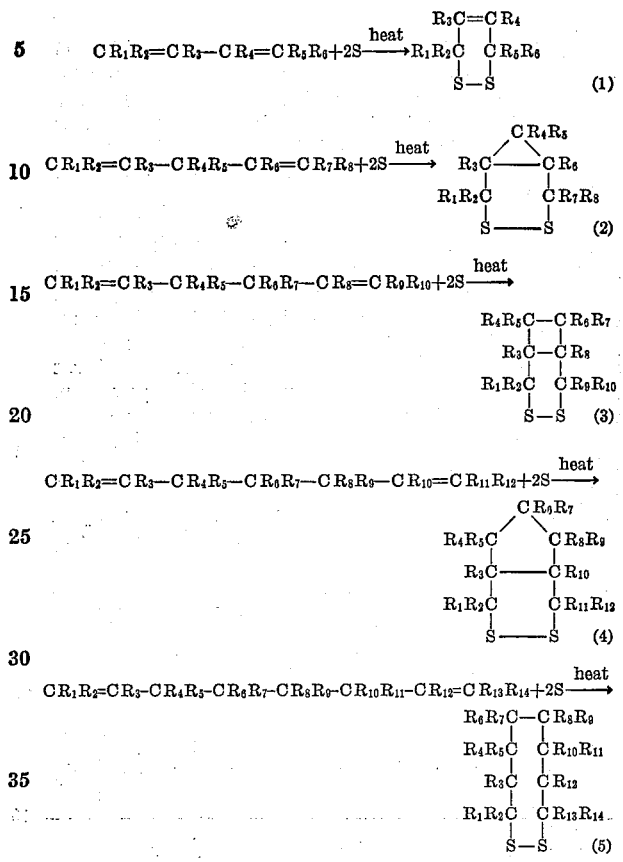

In a preferred embodiment of this invention the R substituents are halogen atoms, most preferably fluorine. However, it is within the scope of this invention to select R substituents from perhalogenated radicals such as perfluoroalkyl, perfluoroaryl, perfluoroacyl, perfluoroether, perfluorochloroalkyl, perfluorochloroaryl, perfluorochloroacyl, perfluorochloroether, etc. The R substituents on any one of the above compounds may be the same or different.

Apparently the mechanism of the reaction is such that the sulfur atoms form a disulfide linkage connecting the two most remote unsaturated carbon atoms of the diolefin while another bond is formed between the other two, more proximate unsaturated carbon atoms, of the diolefin, thereby creating a six-membered heterocyclic ring structure. If the straight chain contains between 5 and 8 carbon atoms, a bicyclic compound results, as illustrated by compounds 2 to 5 in the above equations.

The following illustrative perhaloolefins may be reacted with sulfur and are within the scope of this invention: perfluorobutadiene-1,3; perfluoropentadiene-1,4; perfluorohexadiene-1,5; perfluoroheptadiene-1,6; perfluorooctadiene-1,7; 3-chloroperfluoropentadiene-1,4; 4-chloroperfluoroheptadiene-1,6; and 3,5-dichloroperfluorooctadiene-1,7.

Reaction of sulfur with the above perhalodiolefins is effected at elevated temperatures, usually above 200° C. but below the decomposition temperature of the diolefin reactant and disulfide product. A preferred temperature range is from about 200° C. to about 350° C. Temperatures lower than 200° C. generally tend to lengthen the reaction time and reduce the yield of the disulfide.

As an example of the preferred embodiment of this invention, sulfur is reacted with perfluoropentadiene-1,4 at elevated temperatures, as follows:

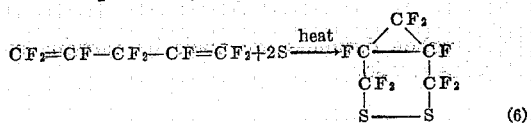

A 300 ml. metal autoclave was charged with 200 grams (1.234 moles) of perfluoropentadiene-1,4 and 80 grams (2.5 moles) of sulfur. The autoclave was raised to 300° C. and maintained at this temperature under autogenous pressure for a period of about 24 hours with rocking. In order to recover volatiles prior to opening, the autoclave was bled through a series of Dry Ice trays. The product mixture (197.2 gms.) was fractionally distilled, the greater portion (132.5 grams) distilling off in the 107–112° C. temperature range. Further distillation of this fraction indicated the presence of a chemical compound with a boiling point of 107.5° C. at 739 mm. pressure. This compound was a white, low melting, solid material with a melting point of 91.5° C. Tests for unsaturation, i.e. reactivity with bromine, potassium permanganate and hydrogen peroxide, proved negative although similar tests on the lower boiling fractions produced positive results. Sulfur analysis indicated a sulfur content of 23.5%, closely approximating the 23.2% sulfur content of $C_5F_8S_2$. The structure appearing in equation (6) above was positively identified by means of nuclear magnetic resonance, thereby confirming the existence of perfluorobicyclo - (4,1,0) - 3,4 - dithiaheptane. Using similar procedures the following data was obtained.

Table I

| Example | Perfluoropentadiene-1,4 | Sulfur | Reaction Conditions | Perfluorobicyclo-(4,1,0)-3,4-dithiaheptane, gms. |
|---|---|---|---|---|
| 2 | 21.2 gms. (0.1 mole). | 3.2 gm. (0.1 mole). | Glass tube, 250° C., 15.5 hrs. | 1.7 |
| 3 | 21.2 gms. (0.1 mole). | 6.4 gm. (0.2 mole). | Aminco bomb, 300° C., 16 hrs. | 6.4 |
| 4 | 100 gms. (0.617 mole). | 40 gm. (1.25 mole). | Aminco bomb, 300° C., 18 hrs. | 63 |

It will be obvious to those skilled in the art that many modifications may be made within the scope of the present invention without departing from the spirit thereof, and the invention includes all such modifications.

I claim:
1. A compound having the structure

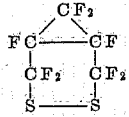

2. A chemical compound of the structure

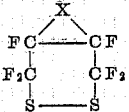

in which X is a saturated, aliphatic, perfluorinated alkylene radical consisting of from 1 to 4 carbon atoms.

3. A chemical compound of the structure

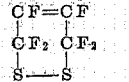

4. A process for producing a perfluorinated heterocyclic disulfide which comprises reacting sulfur with a perfluorodiolefin consisting of a straight chain of from 4 to 8 carbon atoms, each of said carbon atoms having at least one fluorine substituent, said reaction being conducted at a temperature above 200° C. and below the decomposition temperatures of the diolefin reactant and the disulfide product.

5. The process of claim 4 in which the perfluorodiolefin is perfluoropentadiene-1,4.

References Cited in the file of this patent

UNITED STATES PATENTS 2,410,401   Coffman _____ Oct. 29, 1946

OTHER REFERENCES

Chemical Abstracts, vol. 49, col. 8907c (1955). Abstract of B. A. Arbuzov et al. Doklady Akad. Nauk U.S.S.R., vol. 96, pp. 983–985 (1954).

UNITED STATES PATENT OFFICE
CERTIFICATION OF CORRECTION

Patent No. 2,968,659            January 17, 1961

Calvin J. Benning

It is hereby certified that error appears in the above numbered patent requiring correction and that the said Letters Patent should read as corrected below.

Column 2, lines 32 to 38, the lower portion of the formula should appear as shown below instead of as in the patent:

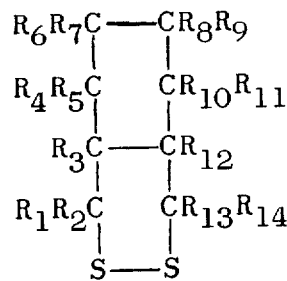

Signed and sealed this 20th day of June 1961.

(SEAL)
Attest:

ERNEST W. SWIDER
Attesting Officer

DAVID L. LADD
Commissioner of Patents